United States Patent [19]
Bolt

[11] Patent Number: 5,886,069
[45] Date of Patent: Mar. 23, 1999

[54] TITANIUM DIOXIDE PARTICLES HAVING SUBSTANTIALLY DISCRETE INORGANIC PARTICLES DISPERSED ON THEIR SURFACES

[75] Inventor: John Davis Bolt, Landenberg, Pa.

[73] Assignee: E. I. du Pont de Nemours and Company, Wilmington, Del.

[21] Appl. No.: 854,024

[22] Filed: May 8, 1997

Related U.S. Application Data

[63] Continuation-in-part of Ser. No. 558,116, Nov. 13, 1995, Pat. No. 5,650,002.

[51] Int. Cl.⁶ ............................. C08K 7/16; C09C 1/36
[52] U.S. Cl. ............... 523/223; 106/286.4; 106/287.19; 106/436; 106/442; 106/444; 106/449
[58] Field of Search .................... 106/286.4, 287.19, 106/436, 442, 444, 449; 523/223

[56] References Cited

U.S. PATENT DOCUMENTS

| | | | |
|---|---|---|---|
| 2,187,050 | 1/1940 | Patterson | 106/300 |
| 3,297,535 | 1/1967 | Butler et al. | |
| 3,528,838 | 9/1970 | Brixner | 106/300 |
| 3,595,822 | 7/1971 | Swank | 260/29.6 R |
| 3,737,371 | 6/1973 | Bazler et al. | |
| 3,832,206 | 8/1974 | Libera et al. | |
| 3,873,335 | 3/1975 | Schmidt et al. | 106/300 |
| 4,011,096 | 3/1977 | Sandell | |
| 4,090,887 | 5/1978 | Marquisee et al. | |
| 4,132,560 | 1/1979 | Marquisee et al. | |
| 4,376,655 | 3/1983 | Weber | 106/300 |
| 4,421,660 | 12/1983 | Sole nee Hajna | 252/62.54 |
| 4,474,909 | 10/1984 | Smith et al. | |
| 4,608,401 | 8/1986 | Martin | |
| 5,116,418 | 5/1992 | Kaliski | |
| 5,269,840 | 12/1993 | Morris et al. | 106/437 |
| 5,312,484 | 5/1994 | Kaliski | |
| 5,346,546 | 9/1994 | Kaliski | |
| 5,665,466 | 9/1997 | Guez et al. | 428/329 |

FOREIGN PATENT DOCUMENTS

| | | |
|---|---|---|
| 10710/76 | 4/1977 | Australia . |
| 0 549 163 | 12/1992 | European Pat. Off. . |
| 586 003 | 3/1994 | European Pat. Off. . |
| 36 44 132 | 12/1986 | Germany . |
| 2-51419 | 8/1988 | Japan . |
| 4-153232 | 10/1990 | Japan . |
| 3-275768 | 12/1991 | Japan . |
| 1358636 | 7/1974 | United Kingdom . |
| 2267286 | 1/1993 | United Kingdom . |
| 2267503 | 5/1993 | United Kingdom . |

OTHER PUBLICATIONS

Database WPI, Week 8626, Derwent Publications Ltd,London,GB; AN 86–165096, JP 61 097 133 A (Mitsubishi Metal Et Al), May 15, 1986.

Database WPI, Week 8706, Derwent Publications Ltd, London, GB; AN 87–039671, JP 61 295 234 A (Sumitumo Chem. Ind), Dec. 26, 1986.

Database WPI, Week 9016, Derwent Publications Ltd, London, GB; AN 90–119734, JP 2 069 572 A (Toyota Jidosha, Mar. 8, 1990.

*Primary Examiner*—Kriellion S. Morgan

[57] ABSTRACT

The present invention relates to $TiO_2$ pigments having $TiO_2$ particles with substantially discrete inorganic particles dispersed on the surfaces of the $TiO_2$ particles. Suitable inorganic particles include silica, calcium carbonate, and mixtures thereof. The substantially discrete inorganic particles have an average diameter size within the range of about 5 to about 50 nm and are dispersed on the surfaces of the $TiO_2$ particles in an amount of less than 20 wt. % based on total pigment weight. This invention also includes coating compositions containing these pigments and processes for making these pigments.

12 Claims, 4 Drawing Sheets

TITANIUM DIOXIDE PARTICLES HAVING SUBSTANTIALLY DISCRETE INORGANIC PARTICLES DISPERSED ON THEIR SURFACES

CROSS-REFERENCE TO RELATED APPLICATIONS

This application is a continuation-in-part of U.S. patent application Ser. No. 08/558,116, filed Nov. 13, 1993, now allowed U.S. Pat. No. 5,560,002.

BACKGROUND OF THE INVENTION

1. Field of the Invention

The present invention relates to $TiO_2$ pigments having $TiO_2$ particles with substantially discrete inorganic particles dispersed on the surfaces of the $TiO_2$ particles. The $TiO_2$ pigments of this invention exhibit improved light scattering efficiency at a moderate to a high pigment volume concentration (PVC) when the pigment is incorporated in coatings applications. The invention also includes processes for making such $TiO_2$ pigments.

2. Description of the Related Art

Inorganic pigments, and especially $TiO_2$ pigments, are often incorporated in various polymers as whiteners, tinting agents or opacifiers. $TiO_2$ is particularly useful for these purposes because it scatters light very efficiently. However a problem encountered is that as the PVC increases in the polymer, the $TiO_2$ particles come close to or in contact with other $TiO_2$ particles which reduces the scattering efficiency of the $TiO_2$, i.e., there is an optical crowding effect. Typically, scattering efficiency or scattering coefficient is measured by hiding power and tinting strength.

While prior art techniques attempt to minimize the foregoing problem, they are deficient in one or more areas. For example, extenders have been added to paint formulations to space the $TiO_2$ particles to preserve scattering efficiency, however, these extenders are difficult to distribute within the paint matrix to maximize the $TiO_2$ hiding power. Extenders are typically larger particles and/or in the form of aggregates and thus tend to increase the effective $TiO_2$ volume concentration and decrease scattering efficiency as they are added to replace paint resin content as described in F. Stieg, "The Effect of Extenders on the Hiding Power of Titanium Pigments", *Official Digest*, 1959, pp. 52–64.

Further, hydrous silica with high surface area can be precipitated onto the surfaces of the $TiO_2$ particles, providing some improvement in scattering efficiency at increasing PVC. However, the $TiO_2$ pigments with hydrous silica coatings with high surface area have a high oil absorption which degrades the paint film integrity, decreases a critical pigment volume concentration (CPVC) as defined hereinbelow, and restricts a paint maker of flexibility in formulating paints. In addition, silicas such as fumed silica are composed of many primary particles which are highly aggregated and cannot be distributed uniformly on the $TiO_2$ surface. Similarly, the use of a polymer coating is expensive and difficult to accomplish and has resulted in severe agglomeration of the $TiO_2$ particles.

Although it is also known to coat metal oxide particles with inorganic a particles by mixing a slurry of the metal oxide particles with a slurry or sol of inorganic particles having a certain particle size, these pigment products are also unsatisfactory for use in coatings and other applications, where the pigment needs to have improved light scattering efficiency.

For example, Morris, U.S. Pat. No. 5,269,840 discloses making colorant clusters by mixing a binder sol with a colorant in particle form to form a pigment sol, and then removing the liquid to form the final colorant clusters. $TiO_2$ particles are disclosed as being suitable colorants and silica can be used as the sol particles. However, the coating of sol particles (e.g., silica) is described as comprising at least 40% by weight of the coated colorant particle (e.g., $TiO_2$). Thus, these colorant particles would not be expected to provide good light scattering efficiency in view of such a high weight percentage of silica coating.

Published Japanese Patent Application Kokai Hei 3-275768 discloses a process for surface-treating $TiO_2$ particles, wherein a slurry of $TiO_2$ particles and a sol of alumina particles are mixed together to provide a coating of $Al_2O_3$ at 1 to 20% by weight based on the weight of the $TiO_2$ particles. The primary particle size of the alumina particles in the sol is not disclosed. However, the objective of this process is to provide an alumina film coating on the surface of the $TiO_2$ particles. Thus, it is believed that the primary particle size of the alumina particles would have to be very small in order to produce an effective film coating. These small alumina particles would agglomerate when mixed with the slurry of $TiO_2$ particles to form a film coating on the surface of the $TiO_2$ particles. These $TiO_2$ particles would not be expected to provide improved light scattering efficiency in view of this surface film of alumina.

Patterson, U.S. Pat. No. 2,187,050 discloses a process for coating $TiO_2$ pigment by first forming a precipitate of hydrated aluminum oxide, purify it, then preparing a slurry or suspension of the alumina and blending this slurry or suspension with a slurry or suspension of $TiO_2$ pigment. The mixed slurry is then filtered, and the $TiO_2$ pigment is dried. The particle size of the alumina particles in the alumina slurry or suspension is not disclosed. Weber, U.S. Pat. No. 4,376,655 also discloses a process for coating $TiO_2$ pigment by blending an amorphous aluminum hydroxide gel with $TiO_2$ particles and water to provide an aqueous slurry of $TiO_2$ pigment. This process improves the optical efficiency of the $TiO_2$ pigment slurry for application to paper products or other coating applications. The particle size of the alumina particles in the aluminum hydroxide gel is not disclosed. However, gels generally have interconnected particles and thus discrete particles do not form on the surfaces of the $TiO_2$ particles.

Published Japanese Patent Application Kokai No. 2-51419 discloses a process, where CaCl2 is dissolved in a slurry of TiO2 particles, NH4OH is introduced, and then CO2 gas is introduced into the slurry. Published Japanese Patent Application Kokai No. 2-51419 also discloses a TiO2 pigment product having a film-like coating of CaCO3 at 50 wt. % based on the weight of the coated pigment. A film-like coating of CaCO3 is described as not being obtained by the processing methods used in Comparative Example 1.

Published UK Patent Application GB 2 267 503 A describes a process for making a composite particulate pigmentary material, wherein a dispersion of a particulate pigmentary material (e.g., $TiO_2$ particles) having a positive or negative surface charge is mixed with a dispersion of a second particulate material (e.g., polymer microspheres, silica, silicates, aluminates, sulphates, carbonates, or clays) having a surface charge with an opposite sign. The average size of the non-pigmentary particles is described as being preferably between 0.02 and 0.3 microns. The ratio of $TiO_2$ to non-pigmentary particles is described as being preferably in the range from 0.3:1 to 3:1 by volume.

There is a need for a $TiO_2$ pigment product that has improved scattering efficiency at moderate to high PVC.

Concomitantly, were is a need for a $TiO_2$ pigment having a low oil absorption so that the paint film integrity can be maintained. The present invention meets these needs.

SUMMARY OF THE INVENTION

The present invention provides a $TiO_2$ pigment consisting essentially of $TiO_2$ particles having substantially discrete inorganic particles having an average diameter size within the range of about 5 to about 50 nm dispersed on the surfaces of the $TiO_2$ particles in an amount of less than 20 wt. % based on the total pigment weight. Preferably, the inorganic particles have an average diameter size within the range of 7 to 35 nm, and more preferably within the range of 10 to 25 nm. Preferred inorganic particles include silica, calcium carbonate, and mixtures thereof. In one preferred embodiment, calcium carbonate particles in an amount of less than 15 wt. % are dispersed on the surfaces of the $TiO_2$ particles.

This invention also includes polymeric coating compositions comprising the $TiO_2$ pigment of this invention at a pigment volume concentration of 25% where the $TiO_2$ pigment has a light scattering coefficient greater than 0.31 m2/g, or at a pigment volume concentration of 35% where the $TiO_2$ pigment has a light scattering coefficient greater than 0.26 m2/g. Preferably, the $TiO_2$ pigment in these coatings also has an oil absorption of less than 25.

This invention also encompasses different processes used to make the above-described $TiO_2$ pigments. In one embodiment, an aqueous slurry of $TiO_2$ particles is mixed with a colloidal suspension of inorganic particles having an average diameter size within the range of about 5 to about 50 nm, wherein the $TiO_2$ particles and the colloidal particles are both above or below their respective isoelectric points such that substantially discrete inorganic particles are dispersed onto the surfaces of the $TiO_2$ particles in an amount less than 20 wt. % based on total pigment weight. In another embodiment, an aqueous slurry of $TiO_2$ particles is mixed with $Ca(OH)_2$, and $CO_2$ gas is added to the resulting slurry to form in-situ substantially discrete $CaCO_3$ particles having an average diameter size within the range of about 5 to about 50 nm, wherein the $CaCO_3$ particles are dispersed onto the surfaces of the $TiO_2$ particles in an amount less than 20 wt. % based on total pigment weight. Alternatively, CaO can be added and mixed with the aqueous slurry of $TiO_2$ particles, and $CO_2$ gas may then be added to the resulting slurry to form the in-situ substantially discrete $CaCO_3$ particles.

DETAILED DESCRIPTION OF THE INVENTION

The $TiO_2$ particles used to make the $TiO_2$ pigments of this invention can be of a conventional rutile or anatase variety, produced by either a chloride or a sulfate process. Preferably, rutile $TiO_2$ particles made by the chloride process with a particle size in the range of about 100 to about 500 nm (0.1 to 0.5 microns) are used. The chloride production of $TiO_2$ pigment by the vapor phase oxidation of $TiCl_4$ and $AlCl_3$ is well known and disclosed in U.S. Pat. Nos. 2,488,439, and 2,559,638, the teachings of which are incorporated herein by reference. The $TiO_2$ particles used to prepare the $TiO_2$ pigment of this invention can be base $TiO_2$, referred to herein as $TiO_2$ particles directly removed from oxidizing $TiCl_4$ and before any finishing steps and/or before any surface treatments are applied. In the sulfate process, base $TiO_2$ refers to $TiO_2$ particles before any surface treatments are applied. Alternatively, the $TiO_2$ particles used to prepare the pigments of this invention can be finished $TiO_2$ particles, referred to herein as $TiO_2$ particles subjected to conventional finishing steps and/or surface treated with hydrous oxides such as alumina, silica, zirconia or the like, or combinations of these materials, as described in, for example, U.S. Pat. No. Re 27,818 and U.S. Pat. No. 4,125, 412, the teachings of which are incorporated herein by reference. The hydrous oxides can range from about 16 weight % or less of the total $TiO_2$ pigment product weight, and preferably 10 weight % or less. Contemplated equivalents include other white pigments such as zinc oxide, zinc sulfide, basic lead sulfate, basic lead carbonate, antimony oxide, lithopone or the like.

The inorganic particles used to coat the surfaces of the $TiO_2$ particles or its equivalent in carrying out the invention can be varied. Preferably, the inorganic particles do not substantially absorb visible light and do not adversely interact with other components in an end-use application. One important aspect is the size of the inorganic particles (i.e., primary particles and aggregates or agglomerates, if present, of the primary particles) It is desirable that the inorganic particles be smaller than the $TiO_2$ pigment particles. Typically, the average size of the inorganic particles is within the range of about 5 to about 50 nm (0.005–0.05 microns) in diameter, preferably about 7 to about 35 nm (0.007–0.035 microns), and more preferably about 10 to about 25 nm (0.01–0.025 microns). In accordance with the present invention, the inorganic particles form a noncontinuous coating of a discrete particulate form and can be observed and measured by electron microscopy such as transmission electron microscopy.

Examples of inorganic particles include, but are not limited to particles of the following inorganic materials including those in hydrated form: oxides of silicon, titanium, zirconium, zinc, magnesium, aluminum, yttrium, antimony, cerium, and tin; sulfates of barium and calcium; sulfides of zinc; carbonates of zinc, calcium, magnesium, lead and mixed metals, such as naturally occurring dolmite which is a carbonate of calcium and magnesium, $CaMg(CO_3)_2$; nitrides of aluminum; phosphates of aluminum, calcium, magnesium, zinc, and cerium; titanates of magnesium, calcium, and aluminum; fluorides of magnesium and calcium; silicates of zinc, zirconium, calcium, barium, magnesium, mixed alkaline earths and naturally occurring silicate minerals and the like; aluminosilicates of alkali and alkaline earths, and naturally occurring aluminosilicates and the like; aluminates of zinc, calcium, magnesium, and mixed alkaline earths; hydroxides of aluminum, diamond; or the like and above mixtures or composites thereof. As used herein, mixtures refer to a physical mixture of inorganic particles containing more than one type of particulate form. As used herein, composites refer to intimate combinations of two or more inorganic materials in a single particle or any other combination wherein at least two distinct inorganic materials are present in an aggregate particle.

Preferred inorganic particles are silica, titanium dioxide, zirconium oxide, zinc oxide, magnesium oxide, tin oxide, calcium carbonate, magnesium carbonate, calcium phosphate, aluminosilicates including alkali and alkaline earth aluminosilicates and naturally occurring aluminosilicate and the like, calcium silicates and naturally occurring silicate minerals and the above mixtures or composites thereof.

More preferred inorganic particles are amorphous silica, aluminosilicates including alkali and alkaline earth aluminosilicates, calcium silicates, titanium dioxide, calcium phosphate and calcium carbonate and the above mixtures or composites thereof. Examples of commercially available silica suitable for use in this invention include Ludox® colloidal silica which is available from E. I. du Pont de Nemours and Company, Nalcoag® which is available from Nalco Chemical Company, and Nyacol® which is available from Akzo Nobel.

The amount and size of inorganic particles will influence the surface area and thus impact the oil absorption of the final $TiO_2$ pigment product, as described hereinbelow. For example, larger size inorganic particles within the above prescribed ranges and/or fewer inorganic particles can be used to minimize oil absorption. Typically, the amount of inorganic particles is less than about 20 weight %, based on the total weight of the coated $TiO_2$ pigment, preferably less than about 15 weight %, and more preferably less than about 10 weight %. The inorganic particles can be amorphous or crystalline and the shape of the particles can be spherical, equiaxial, rod-like or platelet. Preferably, the inorganic particle is equiaxial or spherical to minimize oil absorption. Generally, alumina is not equiaxial; rather, it is platelet or ribbon-like. For example, hydrous alumina in the boehmite crystalline form produces platelet or ribbon-like shaped particles and is not preferred. Calcium carbonate ($CaCO_3$) particles tend to be polyhedron-shaped, approximately equiaxial, and silica particles tend to be spherical-shaped.

It is desirable to have a substantially uniform distribution of the inorganic particles on the surfaces of the $TiO_2$ particles. The inorganic particles will be attracted to the $TiO_2$ particle surfaces by van der Waals' forces and may be further anchored to the $TiO_2$ particle surfaces by chemical bonding and/or by hydrous oxide coatings, if present as a topcoat.

Aggregates or agglomerates of inorganic primary particles are also useful as long as the average diameter of the aggregate or agglomerate is within the above prescribed size range of the inorganic primary particles. Aggregates are distinguished from agglomerates in that aggregates are held together by strong bonds such as fusion bonds and cannot be fragmented easily, while agglomerates are weakly bonded and can be broken up by high energy agitation.

The novel $TiO_2$ pigment products of this invention have a surface area of less than about 33 $m^2/g$ preferably less than about 25 $m^2/g$ and more preferably less than about 20 $m^2/g$, and an oil absorption of less than about 35, preferably less than about 25 and more preferably less than about 23.

The $TiO_2$ pigments of this invention can be prepared by a variety of processes. In one process, an aqueous $TiO_2$ slurry is prepared with base $TiO_2$ particles. A colloidal suspension of inorganic particles, i.e., a sol is added to the aqueous $TiO_2$ slurry with sufficient mixing. Mixing can be carried out by any suitable means at a ratio of $TiO_2$ particles to inorganic particles which achieves the desired weight % of discrete particles in the final $TiO_2$ pigment product. "Sol" is defined herein as a stable dispersion of colloidal particles in a liquid containing about 1 to 60% by weight inorganic particles as a dispersion in a liquid typically water. "Colloidal" is used herein to refer to a suspension of small particles which are substantially individual or monomeric particles and small enough that they do not settle. For purposes of this invention, it is important that the average size of the inorganic particles in the colloidal suspension (i.e., sol) be within the range of about 5 to about 50 nm (0.005–0.05 microns) in diameter, preferably about 7 to about 35 nm (0.007–0.035 microns), and more preferably about 10 to about 25 nm (0.01–0.025 microns). These inorganic particles sizes are generally the same sizes in the final $TiO_2$ pigment product. It is preferred that the colloidal suspension be at the highest solids concentration at which the suspension is stable, typically about 14 to 50 wt. % solids. These colloidal suspensions (sols) are commercially available or can be prepared as known in the art. For example, commercially available colloidal silica is about 40–50 wt. % solids and commercially available colloidal alumina is about 20 wt. % solids.

Surprisingly, it has been found that both the particles in the $TiO_2$ slurry and the particles in the colloidal suspension should be preferably both above or both below their respective isoelectric points to achieve a substantially uniform surface coating. The "isoelectric point" is used herein to refer to the pH at which particles have a neutral net charge. The $TiO_2$ particles in the slurry and the inorganic particles in the colloidal suspension may also have opposite charges.

Optionally, hydrous oxides are precipitated onto the base $TiO_2$ particles or $TiO_2$ particles which have been coated with inorganic particles. Such hydrous oxides are silica, alumina, zirconia or the like. These hydrous oxides may be added either before or after the addition of inorganic particles. If the hydrous oxides are added prior to the addition of inorganic particles, then a filtering and washing step may be used prior to the addition of inorganic particles for colloidal suspensions which may be sensitive to flocculation. If such filtering and washing steps are used prior to adding the inorganic particles, then the mixture of $TiO_2$ slurry and colloidal inorganic particles will have a low ionic strength. If ionic strength is low and the pH is such that both the $TiO_2$ particles and the inorganic particles are both above or below their isoelectric points, then it is useful to adjust the pH of the mixture so that either the $TiO_2$ particles or the inorganic particles approach their respective isoelectric points. This additional pH adjustment will generally be necessary whenever the ionic strength of the mixture is low.

It is preferred that the inorganic particles be added before the hydrous oxides are precipitated to further anchor the inorganic particles to the $TiO_2$ particle surfaces. For example, the method for precipitating the hydrous oxides is described in U.S. Pat. No. Re 27,818 and U.S. Pat. No. 4,125,412, the teachings of which are incorporated herein by reference. In precipitating the hydrous oxides, sodium silicate, potassium silicate or any other form of soluble silica is added and neutralized with acid such as HCl, $H_2SO_4$, $HNO_3$, $H_3PO_4$ or the like and then sodium aluminate is added and neutralized with acid. Other means of precipitating hydrous alumina are suitable, such as neutralization of aluminum sulfate or aluminum chloride by base such as NaOH.

The amount of hydrous oxides can vary from about 0 to 16 wt %, based on the weight of the total coated $TiO_2$ pigment. Preferred amounts are 0 to 8 wt % silica, more preferably 0 to 4 wt % silica, and 0 to 8 wt % alumina and more preferably about 0 to 3 wt % alumina. The order of addition is not particularly critical, however, it is preferable that if alumina is added by hydrous alumina precipitation, that this step be done after all of the other oxides have been applied. The conventional finishing steps such as filtering, washing, drying and grinding the $TiO_2$ pigment are known and are subsequently carried out. The resulting product is a dry, finished $TiO_2$ pigment which is useful for end-use applications and/or can be used to prepare a slurry useful for end-use applications. Methods for preparing $TiO_2$ pigment slurries are known in the art, for example, as described in Canadian Patent 935,255, the teachings of which are incorporated herein by reference.

An alternative method of carrying out the invention is forming an aqueous mixture by combining water with the colloidal suspension of inorganic particles as described above in the presence of at least one dispersant. The dispersant can be either added simultaneously with the water or subsequently to the addition of inorganic particles. The dispersant can be selected from those described in U.S. Pat. No. 5,393,510, the teachings of which are incorporated herein by reference. Examples of dispersants include alcohol amines such as 2-amino-2-methyl-1-propanol, 2,2',2"-nitrilotrisethanol, 2,2'-iminobisethanol, 2-aminoethanol and the like, and 1-amino-2-propanol, polyacrylates, citric acid and tetrapotassium pyrophosphate (TKPP) and the like. Typically a combination of the above dispersants is preferred in an amount of about 0.05 to about 5% based on the $TiO_2$ weight. The concentration of inorganic particles in the colloidal suspension is from about 10 to 60 weight % preferably about 30 to 60 wt %. It is preferable that the inorganic colloidal particles be well dispersed and not in an aggregate or flocculated form. As described above, both positive or both negative charges of the inorganic particles in the colloidal suspension and the $TiO_2$ particles are preferred to achieve a substantially uniform surface coating. Finished $TiO_2$ particles are added to this aqueous mixture with high shear mixing or milling as described in greater detail in Canadian Patent 935,255, U.S. Pat. Nos. 3,702,773 and 4,177,081, the teachings of which are incorporated herein by reference. In carrying out the mixing, a high shear mixer or mill such as a Waring blender, homogenizer, serrated disc type agitator, ball mill, sand mill, disc mill, pearl mill, high speed impeller mill or the like can be used. Specific speed characteristics depend on equipment, blade configuration, size, etc., but can be determined readily by one skilled in the art. The total solids content (i.e., $TiO_2$ and inorganic particles) of the resulting slurry is above about 50% by weight, and above 70% by weight is preferred.

In another embodiment of this invention, inorganic particles, such as calcium carbonate ($CaCO_3$) are formed in situ in the presence of $TiO_2$ particles. In this process, an aqueous slurry of $TiO_2$ particles is mixed with a slurry of hydrated lime ($Ca(OH)_2$). Hydrated lime ($Ca(OH)_2$) is practically insoluble; thus, it should be thoroughly dispersed in the $TiO_2$ slurry. Carbon dioxide gas ($CO_2$) is then bubbled into the mixed slurry converting the hydrated lime ($Ca(OH)_2$) to calcium carbonate ($CaCO_3$). It is also possible to use hydrated lime ($Ca(OH)_2$) in dry powder form. In an alternative process, lime ($CaO$) can be hydrated separately by mixing with water, i.e., slaking, and this hydrated lime slurry can then be added to the $TiO_2$ slurry. Alternatively, the lime ($CaO$) can be directly added to the $TiO_2$ slurry so that it hydrates in the presence of the $TiO_2$ particles, and this technique is preferred over the above slaking technique. It is also preferable to maintain the temperature of the $TiO_2$/hydrated lime slurry below 35° C. and preferably below about 22° C. Higher temperatures lead to larger $CaCO_3$ particles being formed which are not desirable for this invention. It is also preferable to form the CaCO3 in the calcite crystalline form which is preferentially formed below 35° C.

Enough hydrated lime ($Ca(OH)_2$) is mixed with the $TiO_2$ particles to give a final concentration of $CaCO_3$ of less than about 20 wt. % based on the total $TiO_2$ pigment weight, preferably less than about 15 wt. %, and more preferably less than about 10 wt. % assuming all of the $Ca(OH)_2$ is converted to $CaCO_3$. The $Ca(OH)_2$ may also be added and carbonated in portions, e.g., the first-half of the hydrated lime may be added and converted to $CaCO_3$, and then the second-half of the hydrated lime may be added and converted to $CaCO_3$. The conversion of $Ca(OH)_2$ to $CaCO_3$ is complete when the pH decrease to about 7 and remains stable. The $CO_2$ gas can be used as-is, or the $CO_2$ gas can be diluted with air, nitrogen, or any other gas inert under these conditions.

The above process can be performed continuously or batchwise. In a batch process, the carbon dioxide gas ($CO_2$) is added to the $TiO_2/Ca(OH)_2$ slurry at a rate sufficient to convert all of the $Ca(OH)_2$ to $CaCO_3$ in 2 to 200 minutes. During the addition of $CO_2$ gas, it is important to keep the slurry well-mixed, preferably in a turbulent mixing regime. Increasing the mixing, for example by increasing the stirring rate, improves the distribution of $CaCO_3$ particles over the $TiO_2$ particle surfaces. Preferably, the slurry vessel contains baffles in order that good mixing of the slurries can be achieved.

If salts are present, such as those formed in the neutralization reactions which precipitate hydrous oxide coatings or scrub salts from the $TiO_2$ oxidation reactor, then the resulting $TiO_2$ pigment product is filtered, washed, and dried in the usual manner. If salts are not present (i.e., they were previously washed-out or never present), then after the in situ formation of the $CaCO_3$ particles on the surfaces of the $TiO_2$ particles, the resulting $TiO_2$ pigment product can be dried, without first filtering and washing the product. For the formation of discrete $CaCO_3$ particles, it is not important whether or not hydrous oxides are present on the surfaces of the $TiO_2$ particles. However, it is preferable to precoat the $TiO_2$ particles with silica to make the $TiO_2$ pigment more photodurable, and this may help nucleate the $CaCO_3$ particles.

The resulting improved $TiO_2$ pigment product of this invention is suitable for use in coating applications, for example, in architectural coatings, industrial coatings, paper coatings, and in paper, paper laminates, plastics and inks. The enhanced light scattering efficiency is best demonstrated in coatings with greater than 15% pigment volume concentration (PVC), preferably greater than 20% PVC, and more preferably greater than 25%. PVC is expressed as a percentage and represents the sum of the pigment volume and extender volume, if present, divided by the sum of the resin volume, extender volume, if present, and pigment volume. Examples of coatings, include but are not limited, to semi-flat interior paints, such as eggshell or satin, and exterior flat paints, and industrial coil coatings. It will be appreciated by those skilled in the art that the semi-flat paints are formulated below the critical pigment volume concentration (CPVC) to maintain film integrity for scrub and stain resistance. The exterior flat paints are formulated at or near the CPVC to maintain film integrity and to obtain maximum weatherability. The CPVC is defined herein as the specific PVC at which the vehicle demand of the pigment is precisely satisfied, as described in greater detail in C. Martens, "Technology of Paints, Varnishes and Lacquers", 1968, pp.

498–500, the teachings of which are incorporated herein by reference. This concentration is critical, because above or below this value the properties of a formulation change dramatically. The $TiO_2$ paint formulations are made by techniques known in the art and are described in greater detail in *Paint and Surface Coating—Theory and Practice*, edited by R. Lambourne, Ellis Harwood Limited (1987) and *Principles of Paint Formulation*, edited by R. Woodbridge, Blackie & Sons Limited (1991), the teachings of which are incorporated herein by reference.

To give a clearer understanding of the invention, the following Examples are construed as illustrative and not limitative of the underlying principles of the invention in any way whatsoever.

EXAMPLES

Comparative Example 1

A finished $TiO_2$ slurry was made by dispersing 1000 g of an enamel grade $TiO_2$ having hydrous oxide coatings of silica and alumina in 295 g of water containing dispersants using a high speed, high shear mixer with a 2 inch blade at 2000 RPM for 15 minutes. Final solids content of the slurry was 76.5% by weight. The pH was 9.

A latex emulsion paint concentrate was prepared using a Rhoplex® HG-74M acrylic copolymer vehicle, available from Rohm & Haas Company, modified for compability with the finished $TiO_2$ slurry. The paint concentrate was made without incorporating any $TiO_2$ and was tinted with a green tinting agent. As formulated, the paint concentrate contained 32% by weight solids.

18.23 g of the $TiO_2$ slurry was combined with 46.77 g of the a latex emulsion paint concentrate and shaken 5 minutes to make a paint with a PVC of 20% in the dried paint film, based on a pigment density of 4.0 g/cm$^3$ and a resin density of 1.07 g/cm$^3$. Similar combinations of pigment slurry and paint concentrate were combined to make paints containing 30 and 35% PVC. These paints were drawn down using a 0.002 inch Bird applicator onto black and white substrates and air dried. The green (Y) reflectance values over black and white were measured and the Kubelka-Munk K/S values calculated and reported in Table 1. The green (Y) reflectance value was measured using a Hunter Lab Scan reflectance spectrocolorimeter. The Kubelka-Munk (K(S) values were calculated using equations found in D. B. Judd and G. Wyszecki, "Color in Business, Science and Industry", 2nd ed., John Wiley & Sons, NY, 1963, pp. 396–397, the teachings of which are incorporated herein by reference.

Example 2

The same enamel grade $TiO_2$ (910 g), was dispersed as in Comparative Example 1 in about 160 g of water containing dispersants and 225 g of a 40 wt % dispersion of colloidal silica in water, (Ludox® AS-40 colloidal silica, nominal particle size 22 nm, available from DuPont). The final slurry contained 76.5 wt % solids. On a dry weight basis, the pigment was comprised of 9% $SiO_2$ derived from colloidal silica. It had a calculated density of 3.73 g/cm$^3$ (based on a silica density of 2.2 g/cm$^3$). Green tinted paints were made as in Comparative Example 1 at PVCs of 20, 30, and 35% with adjustment for the lower pigment density. K/S values were obtained from drawdowns on black and white substrates. Results are in Table 1.

Examples 3–4

Similar combinations of Ludox® AS-40 (colloidal silica having a nominal particle size of 22 nm) and $TiO_2$ were made as in Example 2 to produce slurries of pigments comprised of 4.5% and 2.5% $SiO_2$ derived from colloidal silica (calculated pigment densities were 3.86 and 3.92 g/cm$^3$, respectively). Slurry wt % solids were 76.5%. Green tinted paints at 20, 30, and 35% PVCs were made as in the above Examples and K/S values were similarly obtained. Results are in Table 1.

Tinting strengths were calculated at each PVC for Examples 2–4 relative to the Comparative Example 1 by taking the ratio of K/S of the Comparative Example divided by K/S for the Examples 2–4. At any particular PVC, K is constant due to a constant concentration of green pigment. Thus, tinting strength is the scattering coefficient, S, normalized to the Comparative Example. See Table 1. The higher tinting strengths of Examples 2–4 than of Comparative Example 1, despite the lower contents of $TiO_2$ in the paint, demonstrates the improvements in scattering coefficient.

TABLE 1

| K/S VALUES AND RELATIVE TINTING STRENGTHS | | | |
|---|---|---|---|
| | PVC = 20% | PVC = 30% | PVC = 35% |
| | K/S values | | |
| Comparative Example 1 | 0.140 | 0.108 | 0.100 |
| Example 2 | 0.137 | 0.100 | 0.088 |
| Example 3 | 0.132 | 0.102 | 0.091 |
| Example 4 | 0.134 | 0.103 | 0.094 |
| | Relative Tinting Strength | | |
| Comparative Example 1 | 100% | 100% | 100% |
| Example 2 | 102% | 108% | 114% |
| Example 3 | 106% | 106% | 109% |
| Example 4 | 104% | 104% | 106% |

Example 5

4245 ml of water and 1539 g of base $TiO_2$ prepared by the chloride process from $TiCl_4$, were combined and heated to 90° C. with stirring. The pH was raised to 11 with 165 ml of 10% NaOH. 450 g of Ludox® TM-50 colloidal silica dispersion containing 50% by wt $SiO_2$ with a nominal particle size of 22 nm available from DuPont was added. After stirring 10 min, 267.9 g of sodium silicate solution containing 28% by weight $SiO_2$ and with a $SiO_2$:$Na_2O$ ratio of 3.2 was added. After stirring 10 min, 8% HCl in water was added at a rate of 7 ml/min until the pH reached 7. After 45 minutes at pH about 7 and 90° C., 144 g of sodium aluminate solution was added simultaneously with 380 ml of 8% HCl thus maintaining the pH at 7. After further stirring for 30 minutes the pH was lowered to 6 with HCl and the product was filtered, washed and dried. A second preparation was conducted under the same conditions and the products were combined and ground in a fluid energy mill. The final product was analyzed by x-ray fluorescence and found to contain 2.66% by weight $Al_2O_3$, 15.55% by weight $SiO_2$. Density measured by helium pycnometry was 3.56 g/cm$^3$. Oil absorption was 32.5.

Hiding power is given in Table 2 and compared to a conventional enamel grade titanium dioxide ($C_2$) with low oil absorption and low scattering efficiency, and to a conventional high oil absorption grade with moderate scattering efficiency used in flat paints typically formulated above the CPVC ($C_3$). The product of Example 5 has a moderate oil absorption and improved hiding power. Hiding power measurements were made as described by J. E. McNutt and H. L. Ramsay in *American Paint and Coatings Journal*, April, 1988, p. 46, by the weight drawdown method in an acrylic emulsion resin system (Rhoplex® Multilobe 200 100% acrylic binder) using an average of 3 drawdowns. PVCs were calculated based on the measured TiO$_2$ pigment densities. No extender pigments and no colored pigments were included. The TiO$_2$ product is the only pigment present. Hiding power was determined using Y, the green reflectance measured over black and white backgrounds. Hiding power is expressed as scattering efficiency, S, in units of m$^2$/g of product.

TABLE 2

SCATTERING EFFICIENCY OF TiO$_2$
IN AN ACRYLIC EMULSION RESIN

|  | O.A.* | S(m$^2$/g) 25% PVC | S(m$^2$/g) 35% PVC |
|---|---|---|---|
| Example 5 | 32.5 | 0.363 | 0.320 |
| Example 6 | 19 | 0.350 | 0.297 |
| Example 7 | 18 | 0.336 | 0.287 |
| Example 8 | 17 | 0.330 | 0.276 |
| C2 | 16–18 | 0.303 | 0.253 |
| C3 | 37 | 0.326 | 0.295 |

*Oil Absorption (ASTM Designation D281): The oil absorption value obtained gives information about the vehicle demand of the pigment when it is used in a paint and aids in paint formulation.

In a dry coating application (a paint film) formed from a latex emulsion, formulated below the CPVC and comprised of the product of these embodiments but with no extenders, the hiding power (expressed as scattering efficiency, S, in units of square meters per gram [m$^2$/g] of product of this invention) is greater than 0.31 m$^2$/g at 25% PVC and greater than 0.26 m$^2$/g at 35 PVC, and preferably greater than 0.33 m$^2$/g at 25% PVC and preferably greater than 0.28 m$^2$/g at 35% PVC.

Example 6

8520 ml of water and 3080 g of the base TiO$_2$ used in Example 5 were combined and heated to 74° C. while stirring. 76 ml of 10% NaOH was added increasing the pH to 9.5. 110 g of sodium silicate was added and stirred 10 minutes. 607 g of Ludox® TM-50 (colloidal silica with a nominal particle size of 22 nm) was added and stirred 15 minutes. Another portion of 110 g of sodium silicate was added and stirred. 8% HCl was added at about 7 ml/min until the pH reached about 7. After stirring at 75° C. for 60 min, 265 g of sodium aluminate solution and 720 ml of 8% HCl were added simultaneously. The slurry was stirred an additional 30 min at 75° C., pH was lowered to 6, and the product was subjected to conventional finishing steps as described in Example 5. The product contained 2.43% Al$_2$O$_3$ and 10.04% SiO$_2$; density was 3.63 g/cm$^3$ and oil absorption was 19. Surface area was 25.2 m$^2$/g as measured by the nitrogen BET method.

Scattering efficiency is shown in Table 2. This product has a low oil absorption and a high hiding power.

Example 7

The procedure used in Example 6 was followed except that 290 g of Ludox® TM-50 (colloidal silica with a nominal particle size of 22 nm) was used and 8% HCl was added at 5.5 ml/min. The product contained 2.6% Al$_2$O$_3$, 5.9% SiO$_2$; it had a density of 3.80 g/cm$^3$, an oil absorption of 18 and a surface area of 19.7 m$^2$/g.

Scattering efficiency is shown in Table 2. This product has a low oil absorption and a high hiding power.

Example 8

The procedure used in Example 7 was followed except that 290 g of colloidal silica as a 50% by weight dispersion in water having a particle size of nominally 35 nm diameter was used instead of Ludox® TM-50. The final TiO$_2$ product contained 2.53% Al$_2$O$_3$, 5.95% SiO$_2$, with a density of 3.80 g/cm$^3$ and an oil absorption of 16.8.

Scattering efficiency is shown in Table 2. This product has a low oil absorption and a high hiding power.

Example 9

The procedure used in Example 7 was followed except that 161 g of Ludox® TM-50 (colloidal silica with a nominal particle size of 22 nm) was used. The product contained 2.43% Al$_2$O$_3$ and 4.17% SiO$_2$, had a density of 4.04 g/cm$^3$, a surface area of 15.3 m$^2$/g and an oil absorption of 19.7.

Example 10

8520 ml of water and 3080 g of the base TiO$_2$ used in Examples 5–9 were combined and heated with stirring to 90° C. The pH was adjusted to 10 and 400 g of Ludox® TM-50 (colloidal silica with a nominal particle size of 22 nm) was added and stirred 15 min. Then 220 g of sodium silicate was added, stirred 10 min and 8% HCl addition begun at a rate of 7 ml/min. After pH reached 7, HCl addition was stopped and stirring continued for 45 min at 90° C. Then 265 g of sodium aluminate and 740 ml of 8% HCl were added simultaneously. The slurry was stirred for an additional 30 min as the temperature dropped from 86° to 70° C. The pH was decreased to 6 by HCl addition and the product was filtered washed and dried. After grinding, the product contained 2.56 Al$_2$O$_3$, 7.54% SiO$_2$. Surface area was 16.2 m$^2$/g, density was 3.95 g/cm$^3$, and oil absorption was 22.6.

The methods used to measure scattering efficiency in Examples 5–8 were repeated. Results are shown below in Table 3.

Example 11

The procedure in Example 10 was followed except that the colloidal silica from Example 8 was used. The product contained 2.47 Al$_2$O$_3$, 7.47% SiO$_2$. Surface area was 18.1 m$^2$/g, density was 3.92 g/cm$^3$, and oil absorption was 20.6. Results are shown in Table 3.

TABLE 3

Scattering Efficiency, S, (m$^2$/g) with no extenders:

| PVC % | Example 10 | Example 11 |
|---|---|---|
| 18.8 | 0.370 | 0.339 |
| 23.4 | 0.343 | 0.318 |
| 27.9 | 0.334 | 0.300 |
| 32.9 | 0.288 | 0.270 |
| 37.8 | 0.265 | 0.237 |

Example 12

Figure 1:
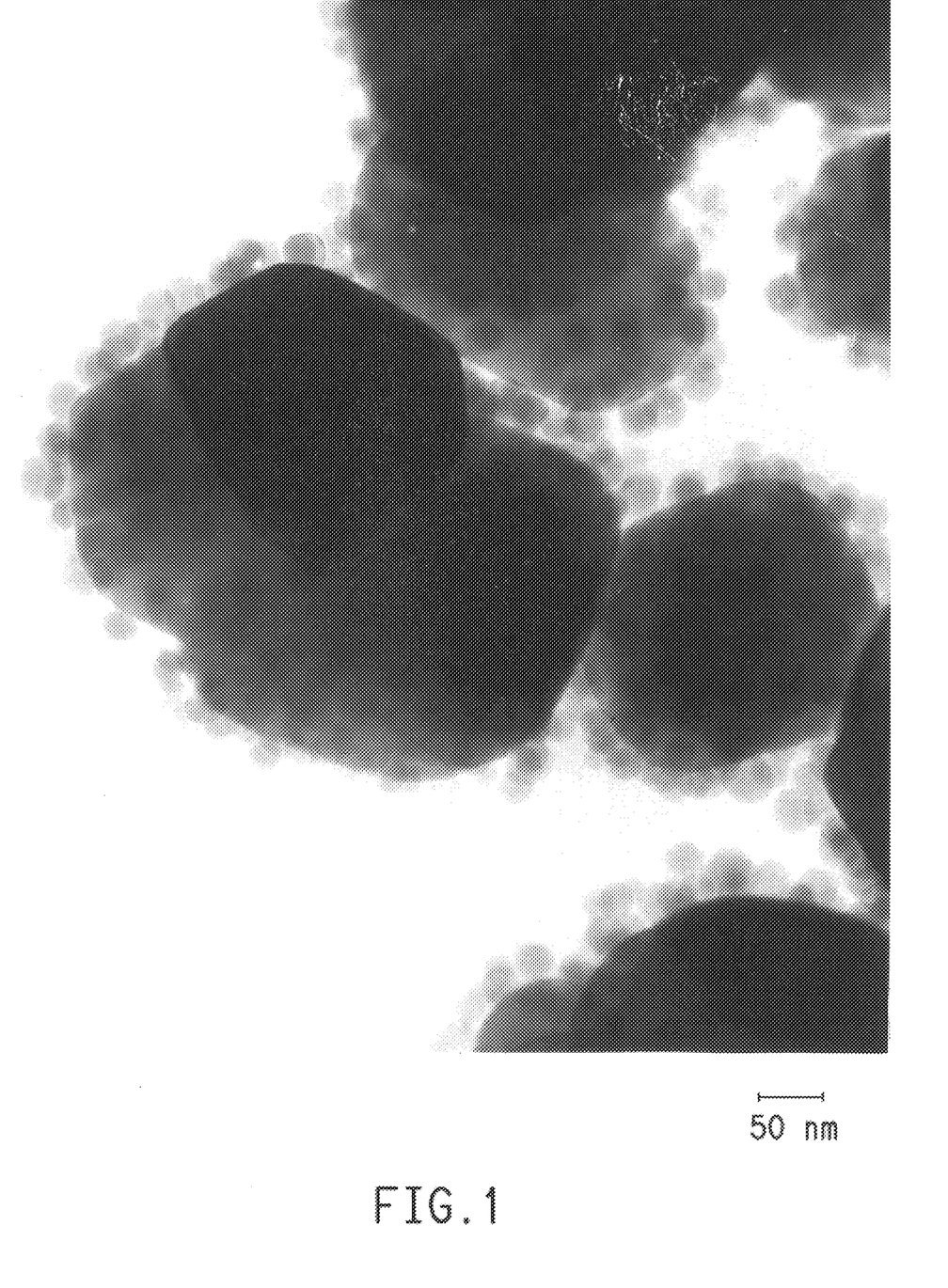
FIG. 1 is a transmission electron micrograph of a $TiO_2$ pigment having substantially discrete particles of silica dispersed on the surfaces of $TiO_2$ particles produced in Example 12 below.

283 ml of water and 102.6 g of the base TiO$_2$ in Examples 5–11 were combined and stirred. This was heated to 90° C. and pH adjusted to about 11. 15 g of Ludox® TM-50 (colloidal silica with a nominal particle size of 22 nm) was added, stirred 10 min and then 8.93 g of sodium silicate was added and stirred 10 min. A solution of 4% by weight HCl was added at about 0.5 ml/min until the pH reached 7. After further stirring at 90° C. and pH about 7, a small sample was removed, filtered, washed and dried. As shown in FIG. 1, transmission electron micrographs show the product morphology as discrete silica particles, approximately 20–25 nm in diameter, attached to the surface of the rutile titanium dioxide particles. $SiO_2$ derived from colloidal silica was about 6–7 wt %. To the remaining major portion of the reaction slurry, 9.6 g of sodium aluminate and 27.4 ml of 8% HCl were added simultaneously. The pH was adjusted to 7 and the slurry stirred at about 75° C. for 30 min. The pH was then adjusted to about 6 and the final product was filtered, washed, and dried. The product contained 2.77% $Al_2O_3$, 8.46% $SiO_2$, and 88.76% $TiO_2$ (normalized to 100%).

Example 13

800 ml of water and 200 g of the base $TiO_2$ used in Examples 5–12 were combined and stirred. The slurry was filtered and washed with water. Half of the resulting wet filter cake was resuspended in water with stirring to a total volume of 400 ml. The pH was adjusted to 3.5 with HCl. 40 g of Dispal® 23N4-20 colloidal alumina dispersion available from Vista Chemical Company was added. This was then heated to 40° C. and pH was adjusted to 10 with 10% NaOH. The slurry was further heated to 60° C. and 5.4 g of sodium silicate solution (28 wt. % $SiO_2$) was diluted in 20 ml of water and added to the $TiO_2$ slurry. The pH was adjusted to 9 and the slurry was stirred for 5 min. The slurry was then adjusted to pH 7, and the product recovered after filtering, washing and drying. The product was analyzed 9.1% $Al_2O_3$, 1.4% $SiO_2$ and 89.4% $TiO_2$ (normalized).

Example 14

50 g of Ti-Pure®, R-706, available from DuPont was dispersed in 150 ml of water at room temperature and stirred vigorously in a high shear, high speed mixer. 3.0 g of $Ca(OH)_2$ was added. While continuing high shear mixing, carbon dioxide was bubbled into the slurry at approximately 300 ml/min for 5 minutes as the pH decreased to about 6.5. The slurry was filtered, washed with a small amount of water and dried at 115° C. Transmission electron micrographs of the product show crystallites of calcium carbonate, roughly equiaxial in shape and typically 20 to 40 nm across which were distributed on the surface of the $TiO_2$ particles. When analyzed by x-ray fluorescence, the composition was 87.9% $TiO_2$, 2.48% $Al_2O_3$, 2.69% $SiO_2$ and 4.38% CaO (analyzed as the oxide). Weight loss measured with a thermogravimetric analyzer in the temperature range from 500° to 750° C. demonstrated that most of the calcium was present as $CaCO_3$. Surface area was 13.3 $m^2/g$.

Example 15

8500 ml of water and 3000 g of base $TiO_2$ were combined and heated to 60° C. while stirring. 8 ml of 10% NaOH was added increasing the pH to about 9. 315 g of Ludox® HS-40 colloidal silica available from DuPont was added. Ludox® HS-40 is a 40 wt. % silica dispersion of 12 nm diameter silica particles. After stirring 15 minutes at 70° C., 225 g of sodium silicate solution was added. After stirring 10 minutes, 8% HCl solution was added at about 10 ml/min. After addition of 220 ml, pH was 8.5 and addition was stopped. After 30 minutes stirring at 70° C., additional HCl was added to bring pH to 7.5. 265 g of sodium aluminate solution and 715 ml of 8% HCl were added simultaneously. The pH was 7.5 after these additions. After 30 minutes stirring, pH was lowered to 7.0 and the product was filtered, washed and dried. The product was analyzed to contain 91.1% $TiO_2$, 2.8% $Al_2O_3$ and 6.1% $SiO_2$ (normalized to 100%). Oil absorption was 24.2. Scattering coefficients were measured: 0.384 $m^2/g$ at 14.7% PVC and 0.327 $m^2/g$ at 23.5% PVC and 0.265 $m^2/g$ at 34.1% PVC.

Example 16

Dry base $TiO_2$ (950 grams) is dispersed by slowly adding it to a suspension containing Ludox® AS-40 colloidal silica having a nominal particle size of 22 nm (125 grams), water (175 grams) and dispersants while stirring with a high speed, high shear impeller. The pH is between 8 and 9. Stirring is continued for about 20 minutes. 84 grams of water is added so that the resulting slurry product contains about 75% solids by weight. On a dry weight basis, the slurry product comprises about 5% $SiO_2$ derived from the colloidal silica dispersion.

Example 17

Figure 2:
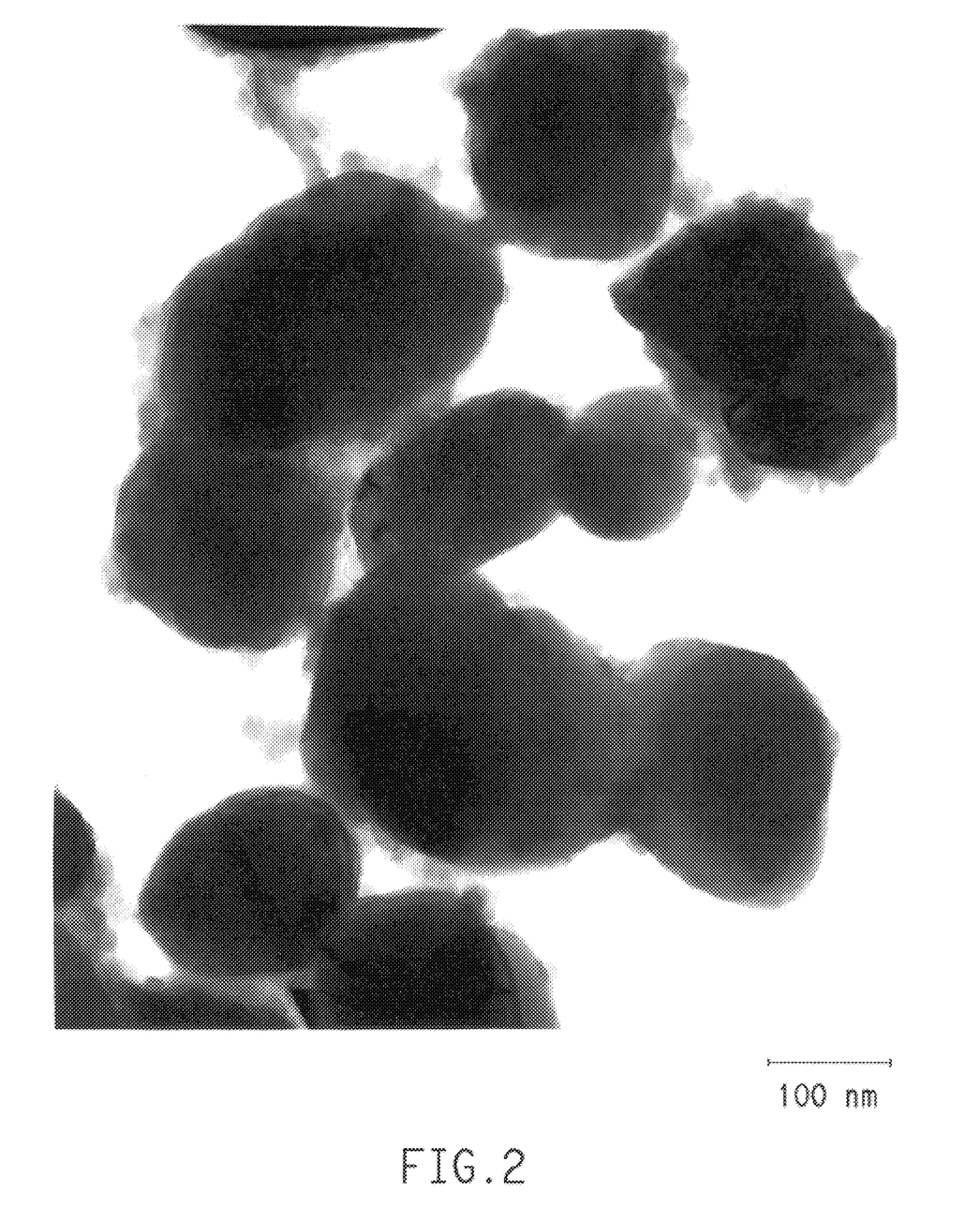
FIG. 2 is a transmission electron micrograph of a $TiO_2$ pigment having substantially discrete particles of silica dispersed on the surfaces of $TiO_2$ particles produced in Example 17 below.

Base $TiO_2$ particles were surface-treated with 3.0% hydrous silica and 1.5% hydrous alumina in a standard process. The treated slurry was filtered and washed to remove salts. The wet filter cake was re-slurried and passed through a media mill to break-up agglomerates. 16,600 pounds of slurry at a pH of 7 and containing 6,490 pounds of surface-treated $TiO_2$ were pumped to a tank equipped with a stirrer. 415 pounds of Ludox TM-50 colloidal silica (50% $SiO_2$, pH 9.0, nominal particle size of 22 nm) were added to the tank. The pH of the mixture was decreased to 6.0 by the addition of 1.5 liters of concentrated HCl. The resulting slurry was pumped to a spray dryer, dried, and then ground in a fluid energy mill. The final product contained 6.3% $SiO_2$ and 2.4% $Al_2O_3$. Density was 3.88 $g/cm^3$. Oil absorption was 16.4, and the surface area was 18.5 m2/g. As shown in FIG. 2, transmission electron micrographs show the product morphology as discrete silica particles, approximately 20–25 nm in diameter, attached to the surface of the rutile titanium dioxide particles. Scattering efficiency was determined by the methods used in the previous examples (examples 5–8; Table 2); at 24% PVC, S=0.341 m2/g as an average of two determinations.

Example 18

Figure 3:
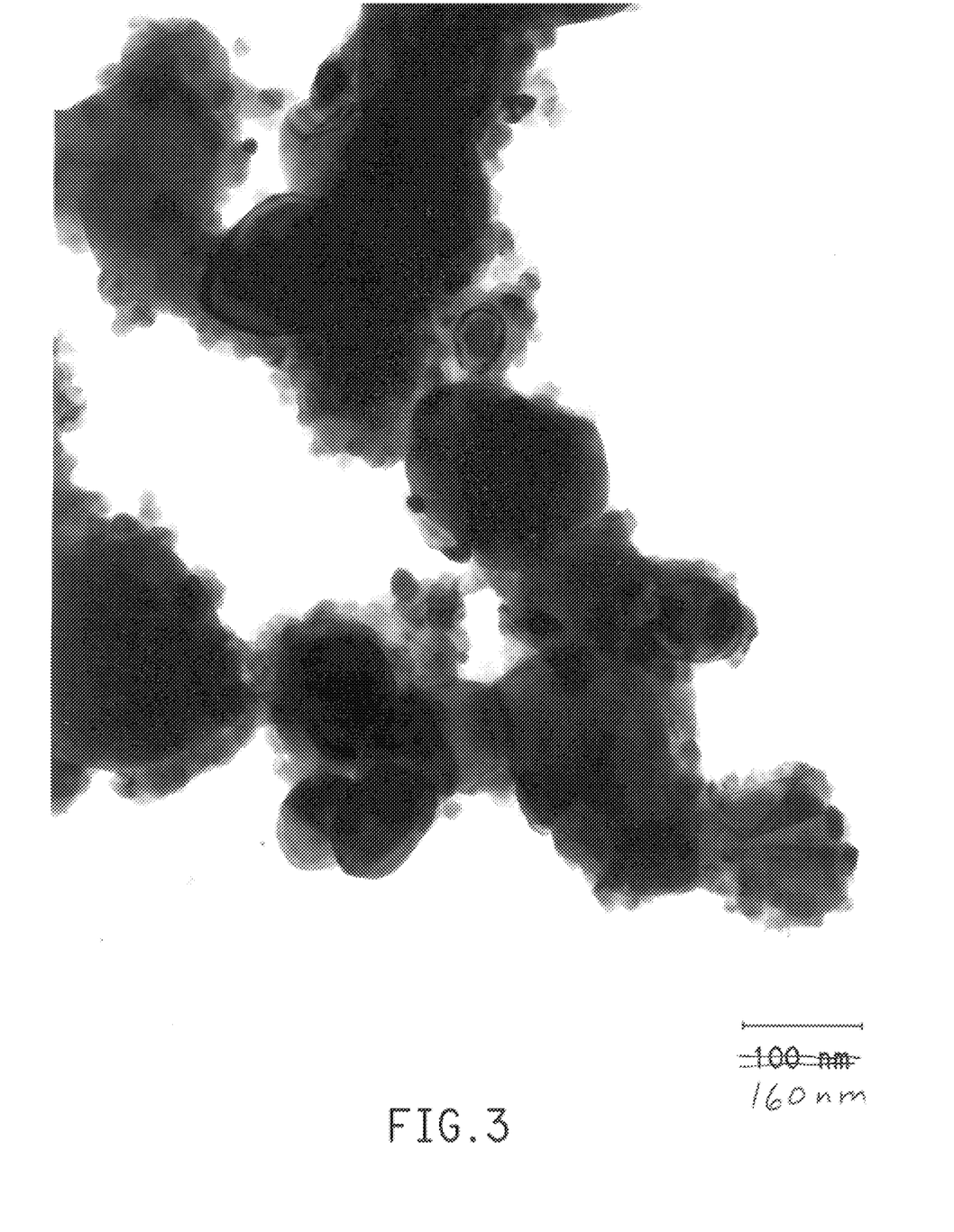
FIG. 3 is a transmission electron micrograph of a $TiO_2$ pigment having substantially discrete particles of calcium carbonate dispersed on the surfaces of $TiO_2$ particles produced in Example 18 below.

120 grams of base $TiO_2$ particles and 400 ml of water were stirred in a steel beaker equipped with 4 vertical baffles and a 1.5 inch diameter impeller type stir blade. The pH of the slurry was adjusted to 8.0 by the addition of dilute NaOH solution. The temperature of the slurry was maintained at 20° C. with an external circulating water jacket. 11.48 grams of CaO were added, and the slurry was stirred at 1000 RPM for 10 minutes to provide a slurry having a pH of 12.5. The stirring rate was increased to 2000 RPM and $CO_2$ gas was introduced into the slurry from the bottom of the beaker at a rate of 60 ml/min. After 118 minutes, the pH dropped to 7.0, and the slurry was filtered, washed with water, and dried at 110° C. The $TiO_2$ pigment product contained 8.2 wt. % of CaO (analyzed as the oxide) which was present as $CaCO_3$. As shown in FIG. 3, a transmission electron micrograph showed that calcium carbonate particles which averaged 36 nm across were dispersed on the surfaces of the $TiO_2$ particles.

Example 19

Figure 4:
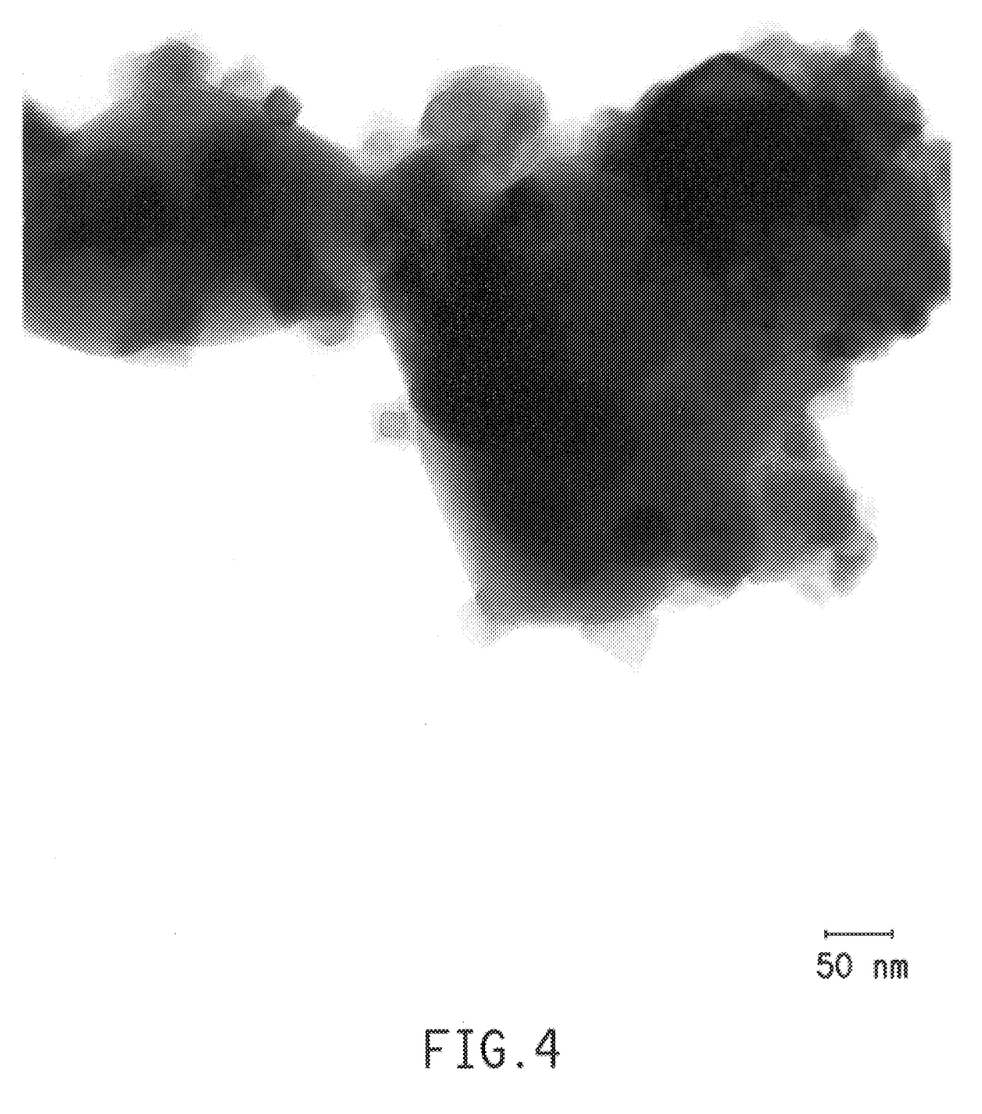
FIG. 4 is a transmission electron micrograph of a $TiO_2$ pigment having substantially discrete particles of calcium carbonate dispersed on the surfaces of $TiO_2$ particles produced in Example 19 below.

120 grams of base $TiO_2$ particles and 400 ml of water were stirred in a steel beaker equipped with 4 vertical baffles and a 1.5 inch diameter impeller type stir blade. The pH of the slurry was adjusted to 8.0 by the addition of dilute NaOH solution. The temperature of the slurry was maintained at 20° C. with an external circulating water jacket. 2.9 grams of sodium silicate solution containing 0.8 g of $SiO_2$ were added to the slurry, and the slurry was stirred for 5 minutes. 11.48 grams of CaO were then added to the slurry, and the slurry was stirred at 1000 RPM for 10 minutes to provide a slurry having a pH of 11.8. The stirring rate was increased to 2000 RPM and $CO_2$ gas was introduced into the slurry from the bottom of the beaker at a rate of 60 ml/min. After 118 minutes, the pH dropped to 7.0, and the slurry was filtered, washed with water, and dried at 110° C. The $TiO_2$ pigment product contained 8.2 wt. % of CaO (analyzed as the oxide) which was present as $CaCO_3$. As shown in FIG. 4, a transmission electron micrograph showed that calcium carbonate particles which averaged 33 nm across were dispersed on the surfaces of the $TiO_2$ particles.

What is claimed is:

1. A $TiO_2$ pigment consisting essentially of $TiO_2$ particles having substantially discrete inorganic particles having an average diameter size within the range of about 5 to about 50 nm dispersed on the surfaces of the $TiO_2$ particles in an amount of less than 20 wt. % based on total pigment weight, wherein the discrete inorganic particles do not substantially absorb visible light.

2. The $TiO_2$ pigment of claim 1, wherein the inorganic particles have an average diameter size within the range of 7 to 35 nm.

3. The $TiO_2$ pigment of claim 1, wherein the inorganic particles have an average diameter size within the range of 10 to 25 nm.

4. The $TiO_2$ pigment of claim 1, wherein the substantially discrete inorganic particles dispersed on the surface of the $TiO_2$ particles are in an amount of less than 10 wt. % based on total pigment weight.

5. The $TiO_2$ pigment of claim 1, wherein the inorganic particles are selected from the group consisting of silica, calcium carbonate, and mixtures thereof.

6. The $TiO_2$ pigment of claim 5, wherein the inorganic particles are calcium carbonate particles, and the calcium carbonate particles are dispersed on the surfaces of the $TiO_2$ particles in an amount of less than 15 wt. % based on total pigment weight.

7. A polymeric coating composition comprising the $TiO_2$ pigment of claim 1 at a pigment volume concentration of 25%, wherein the $TiO_2$ pigment has a light scattering coefficient greater than 0.31 m2/g.

8. A polymeric coating composition comprising the $TiO_2$ pigment of claim 1 at a pigment volume concentration of 35%, wherein the $TiO_2$ pigment has a light scattering coefficient greater than 0.26 m2/g.

9. The polymeric coating composition of claim 7 or 8, wherein the $TiO_2$ pigment has an oil absorption of less than 25.6.

10. A process for preparing a $TiO_2$ pigment, comprising the step of mixing a slurry of $TiO_2$ particles with a colloidal suspension of inorganic particles having an average diameter size within the range of about 5 to about 50 nm, wherein the $TiO_2$ particles and the colloidal particles are both above or below their respective isoelectric points such that substantially discrete inorganic particles are dispersed onto the surfaces of the $TiO_2$ particles in an amount of less than 20 wt. % based on total pigment weight.

11. A process for preparing a $TiO_2$ pigment, comprising the steps of:

(a) mixing an aqueous slurry of $TiO_2$ particles with $Ca(OH)_2$ to form a slurry comprising $TiO_2$ particles and $Ca(OH)_2$, and (b) adding $CO_2$ gas to the slurry formed in step (a) to form in-situ substantially discrete $CaCO_3$ particles having an average diameter size within the range of about 5 to about 50 nm, wherein the $CaCO_3$ particles are dispersed onto the surfaces of the $TiO_2$ particles in an amount of less than 20 wt. % based on total pigment weight.

12. A process for preparing a $TiO_2$ pigment, comprising the steps of:

(a) adding CaO to an aqueous slurry of $TiO_2$ particles and mixing the slurry to form a slurry comprising $TiO_2$ particles and $Ca(OH)_2$, and (b) adding $CO_2$ gas to the slurry formed in step (a) to form in-situ substantially discrete $CaCO_3$ particles having an average diameter size within the range of about 5 to about 50 nm, wherein the $CaCO_3$ particles are dispersed onto the surfaces of the $TiO_2$ particles in an amount of less than 20 wt. % based on total pigment weight.

* * * * *